US005695841A

United States Patent [19]
Mazeika et al.

[11] Patent Number: 5,695,841
[45] Date of Patent: Dec. 9, 1997

[54] MOLDING METHODS, TRACK RESISTANT SILICONE ELASTOMER COMPOSITIONS, AND IMPROVED MOLDED PARTS WITH BETTER ARCING, FLASHOVER, AND POLLUTION RESISTANCE

[75] Inventors: Linas Mazeika, San Carlos; Rong Jong Chang, Freemont; Erling Hansen, Palo Alto; Matt Spalding, Mountain View, all of Calif.

[73] Assignee: Raychem Corporation, Menlo Park, Calif.

[21] Appl. No.: 744,219

[22] Filed: Nov. 15, 1996

Related U.S. Application Data

[63] Continuation of Ser. No. 298,107, Aug. 30, 1994, abandoned, which is a continuation-in-part of Ser. No. 117,261, Sep. 3, 1993, abandoned.

[51] Int. Cl.$^6$ .................................................... B29D 23/00
[52] U.S. Cl. .................. 428/36.92; 428/34.1; 428/35.7; 428/36.9; 428/36.91; 174/176; 174/178; 174/209
[58] Field of Search ................................ 174/176, 178, 174/209; 428/34.1, 35.7, 36.9, 36.91, 36.92

[56] References Cited

U.S. PATENT DOCUMENTS

| | | | |
|---|---|---|---|
| 3,511,698 | 5/1970 | Talcott | 117/138.8 |
| 3,635,874 | 1/1972 | Laur et al. | 260/37 SB |
| 3,833,699 | 9/1974 | Stefanka | 264/94 |
| 3,889,921 | 6/1975 | Weber et al. | 249/161 |
| 4,440,975 | 4/1984 | Kaczerginski | 174/209 |
| 4,521,549 | 6/1985 | Penneck | 523/173 |
| 4,885,039 | 12/1989 | Thevenet | 156/294 |
| 5,008,317 | 4/1991 | Wolfer et al. | 524/262 |
| 5,147,984 | 9/1992 | Mazeika et al. | 174/182 |
| 5,214,249 | 5/1993 | Goch et al. | 174/179 |
| 5,223,190 | 6/1993 | Vallauri et al. | 264/40.1 |

FOREIGN PATENT DOCUMENTS

| | | |
|---|---|---|
| 0 314 160 A2 | 5/1989 | European Pat. Off. . |
| 0314160A2 | 5/1989 | European Pat. Off. . |
| 0 218 461 B1 | 12/1989 | European Pat. Off. . |
| 2 672 423 | 8/1992 | France . |
| 2 231 492 | 12/1994 | France . |
| 1048434 | 3/1965 | United Kingdom . |
| 2 065 661 A | 7/1981 | United Kingdom . |

OTHER PUBLICATIONS

Product Bulletin Raychem Corporation "Contamination–resistant design combines the advantages of polymers and ceramics" Sep. 24, 1993.
Product Bulletin Raychem Corporation "Hybrid Insulators–Combining the Advantages of Polymer and Porcelain" Dec. 1984.
International Electrochemical Commission IEC Report Publicatn 815, 1986 first edition "Guide for the selection of Insulators in espect of polluted conditions".
Technical Guide NGK Insulators "Standard Sheds for Porcelain Shells" 1978.
"Performance of Polymerc Insulating Materials in Salt–Fog" R.S. Gorur et al. Ontario Hydro and University of Windsor 1986 IEEE.
Technical Information Silastic® 29760–V Gray High Voltage Insulator Compound Dow Corning STI 1992.
Raysulate Creepage Extenders A remidy for pollutionflashovers of insulators Raychem EPP0355 Sep. 1990.
"Insulators for High Voltages" J.S. T. Looms, 1988 Peter Peregrinus Ltd. on behalf of the Institute of Electrical Engineers.
Chung Rung Insulators Co. Ltd., Taiwan Power Co Sep. 1971, NGK Insulators Ltd. Drg No. D–139175 (May 1989).
NGK Insulators Ltd. Drg No.D–139175 (May 1989).

*Primary Examiner*—James J. Seidleck
*Assistant Examiner*—Michael A. Williamson
*Attorney, Agent, or Firm*—Herbert G. Burkard; Yuan Chao; A. Stephen Zavell

[57] ABSTRACT

The invention provides for a method of molding an elastomeric material which avoids longitudinal mold lines and an improved molding composition as well as molded parts for hybrid insulators and the like.

5 Claims, 5 Drawing Sheets

5,695,841

MOLDING METHODS, TRACK RESISTANT SILICONE ELASTOMER COMPOSITIONS, AND IMPROVED MOLDED PARTS WITH BETTER ARCING, FLASHOVER, AND POLLUTION RESISTANCE

CROSS-REFERENCE TO RELATED APPLICATIONS

This application is a continuation of application Ser. No. 08/298,107, filed Aug. 30, 1994, now abandoned, which is a continuation-in-part of application Ser. No. 08/117,261, filed Sep. 3, 1993, now abandoned, the disclosures of which are incorporated herein by reference.

TECHNICAL FIELD OF THE INVENTION

This invention relates to improved silicone elastic molding compositions, improved molding methods for high voltage parts, and novel shed designs with improved arcing, flashover, and/or pollution resistance. More specifically, this invention relates to an improved elastomer composition and molding method which removes the vertical (longitudinal) mold line on shedded parts for low, medium, and high voltage insulators, transformer and equipment bushings, cut-out fuse assemblies, power switches, stand-off insulators, and the like.

BACKGROUND OF THE INVENTION

Low, medium, and high voltage insulators were conventionally made of porcelain. The material was highly insulating in dry environments, but the surface resistance tended to decrease by about four or five orders of magnitude in polluted, wet, or humid environments. The material was also heavy and brittle, which limited its design possibilities. For example, the surface leakage to clearance ratio of the porcelain insulators is normally limited to 5 to 1, which is often insufficient in highly polluted environments. With this low ratio, collection of pollutants on the porcelain outer surface would result in flashover or arcing and unacceptable high leakage currents from one end of the insulator terminal to the other.

Lighter, more vandal and weather resistant insulators were fabricated with polymeric outer housings which could better withstand thermal cycling and environmental contamination. When these outer polymeric parts were molded, heat shrunk, or slid onto the insulator structure a simplified unit was developed. However, the conventional molding technique to create larger radially extending outer shedded portions required molds which clamped together along the longitudinal axis of the part. This resulted in mold lines which had to be buffed smooth to avoid tracking along the longitudinal axis by the collection of pollutants and other contaminants at the mold line along the shedded part. Filler concentration and compositional differences of the polymer at the mold line also result in increased failures as discussed by Gorour et al. in "Performance of Polymeric Insulating Materials In Salt-Fog", *IEEE Transaction Power Delivery*, Vol 2, No. 2, pp 486–492 April 1987 (pre-print in 1986).

Thus, a molding technique which moves the mold line from the longitudinal axis to the periphery of the sheds would be highly desirable, along with compositions adapted to such techniques. In addition, the composition should function in the highly polluted environments with good flashover and arcing resistance. Furthermore, it would be highly desirable to have a molded part designed to take advantage of the composition's properties to create more optimal and effective shapes for insulators, surge arrester coverings, transformer and equipment bushings, cable terminations, and cut-out fuses than is possible with conventional porcelain designs.

SUMMARY OF THE INVENTION

The previously mentioned desirable molding techniques, compositions, and insulator designs are addressed by various embodiments of the present invention. An embodiment of the invention relates to a molding process which moves the mold line from the longitudinal axis of the part to the periphery of the radial extending sheds. An alternative embodiment of the invention relates to optimized shed designs having greater radial wall extensions from the longitudinal axis. The designs are achieved at least in part through the use of elastomer materials rather than porcelain. A further embodiment of the invention includes optimized elastomer material compositions useful in any molding process, particularly for making better hybrid insulator shedded parts with greater arcing and flashover resistance in highly polluted environments.

Accordingly, in a first embodiment of the invention, there is provided a tubular polymeric shed comprising a central tubular portion and at least two radial wall fin extensions extending therefrom, the shed being made of a molded polymeric composition and having mold flash lines located peripherally on the edges of the the radial wall fin extensions.

In a second aspect of the invention, there is provided a process of molding an elastomeric part having two or more radial wall ring fin extensions extending from a tubular portion thereof, which process places the mold lines on the peripheral edges of the radial wall fin extensions and eliminates longitudinal mold lines, the process comprising the steps of:

(a) bringing to together molding plates containing molding configurations which move along the longitudinal axis of the molded part upon closing and opening of the molds, said plates having flash points along the peripheral edges of the mold to create a molded elastomeric part with portions which extend beyond the main tubular wall and including an insert to create the tubular portion;

(b) injecting material moldable into the elastomeric part into the mold;

(c) curing the material in the mold;

(d) opening the mold so that at least one section of the elastomeric part's radial wall ring fins moves through an opening in a mold plate; and (e) removing the molded elastomeric part.

In a third aspect of the invention, there is provided an improved silicone elastomer composition useful for molding, comprising:

(a) about 100 parts silicone elastomer containing 0.15 to 0.30 mole % vinyl groups and about 0.15 to about 0.30 mole % silicon hydride groups;

(b) about 2 ppm to about 25 ppm platinum catalyst;

(c) about 0 phr to about 20 phr fumed titanium dioxide;

(d) less than about 0.01 phr aluminum trihydrate;

(e) about 5 to about 35 phr red iron oxide; and (f) about 0 to about 50 phr filler.

BRIEF DESCRIPTION OF THE DRAWING(S)

DESCRIPTION OF THE PREFERRED EMBODIMENTS

The preferred embodiments of the invention will be highlighted by reference to the appended drawings. Particularly preferred articles may optionally use the preferred molding compositions and process.

Figure 2:
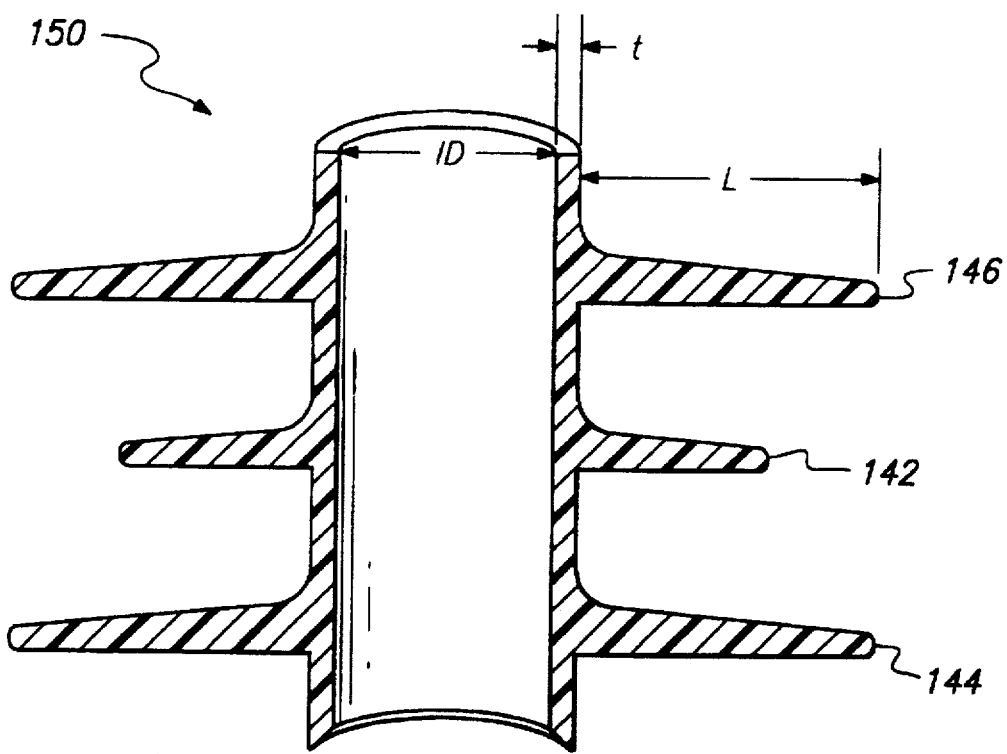
FIG. 2 illustrates an enlarged cross-section of shed element 150 of FIG. 1.
Figure 3:
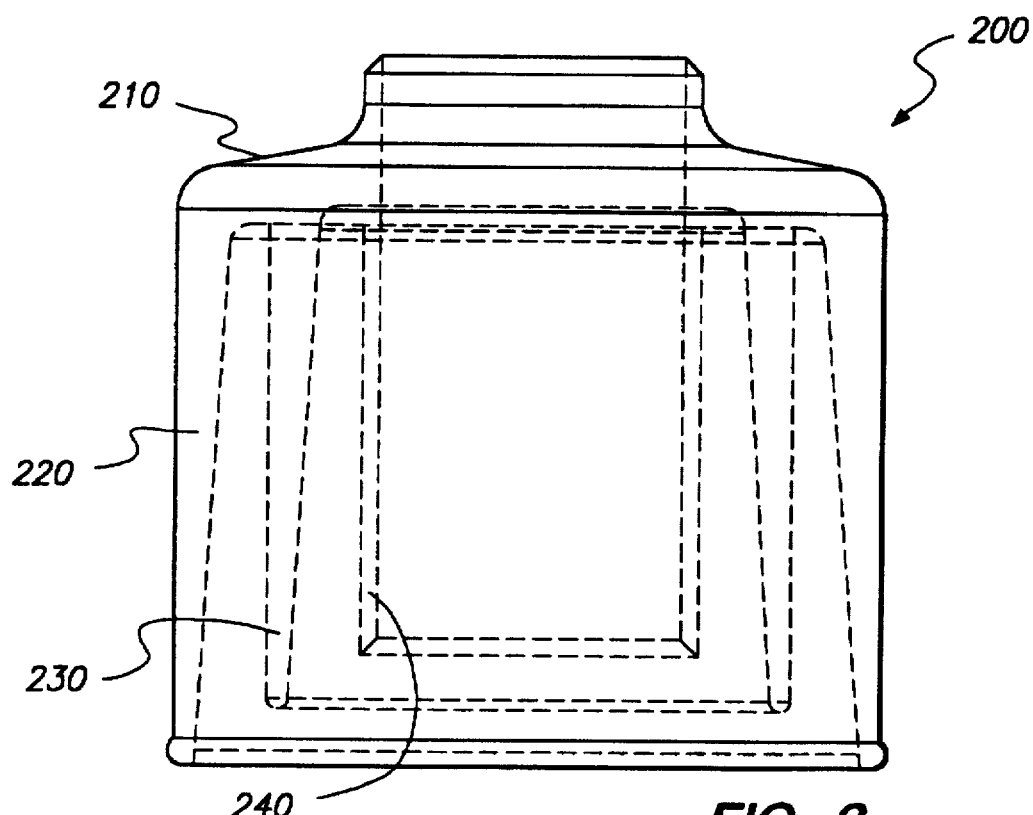
FIG. 3 illustrates a novel shed design of the present invention having multiple concentric bells which optionally is made from the preferred compositions of the present invention.
Figure 4:
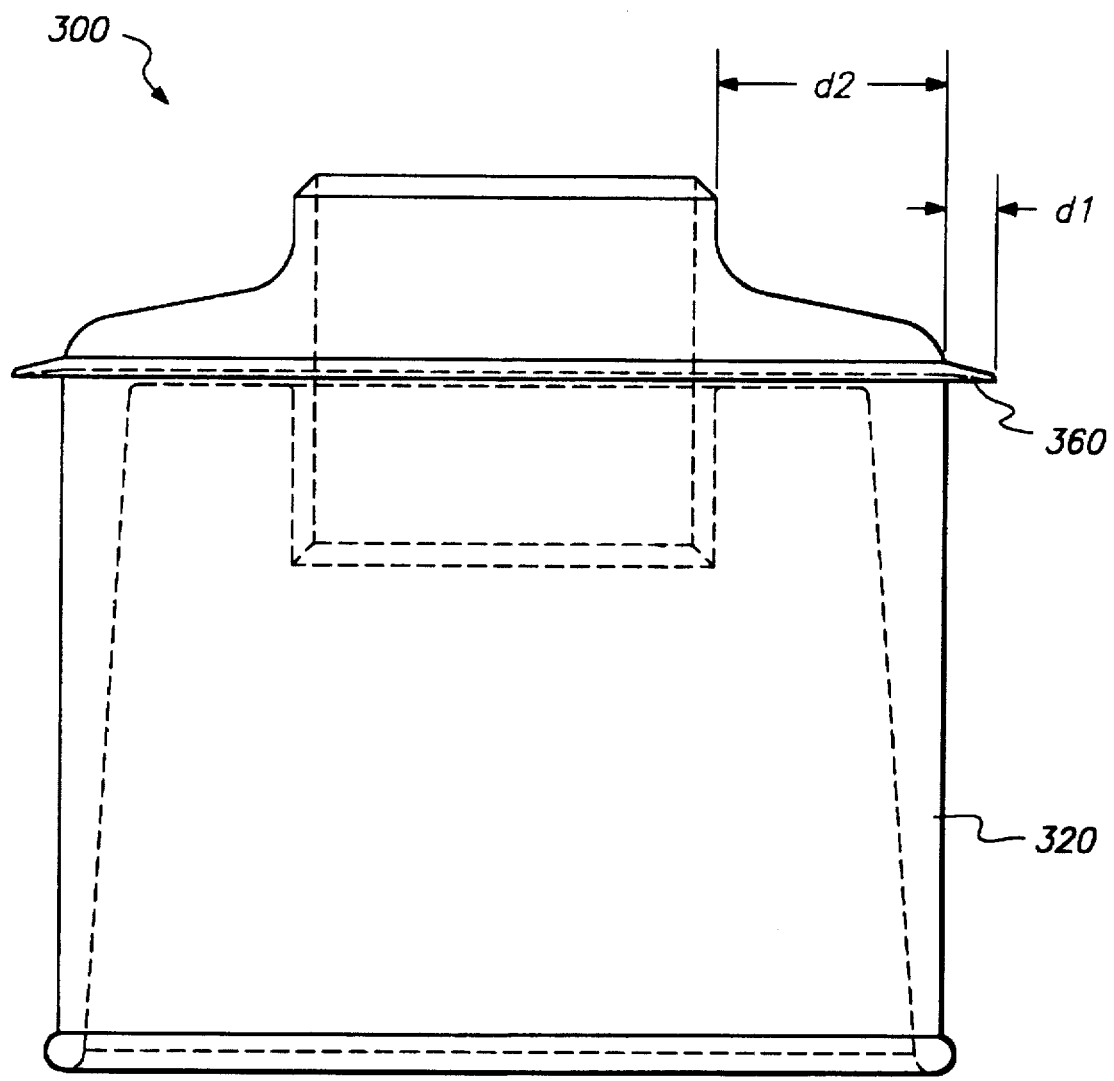
FIG. 4 illustrates a novel shed design with wet flashover ring extensions.
Figure 5:
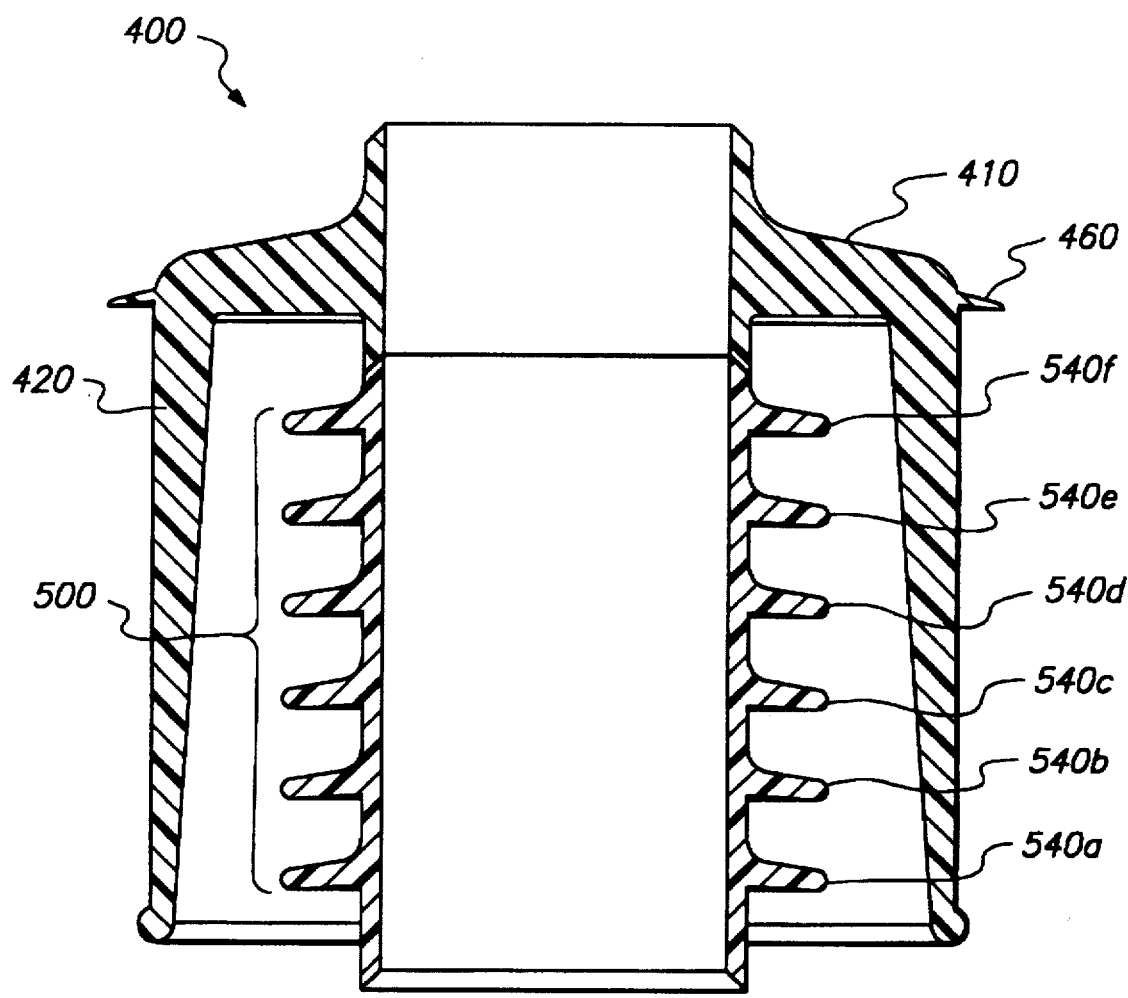
FIG. 5 illustrates a combination novel shed design like that shown in FIG. 3 further including a shed with radial wall ring extensions within the outer bell shaped shed.

Novel shed designs are illustrated in FIGS. 1 through 5. The unique shape and/or dimensions of these shed designs provide enhanced performance of the underlying part such as a ceramic or fiberglass reinforced plastic (FRP) insulating rod or surge arrestor valve elements. In particular, the ring extensions in FIGS. 4 and 5 provide enhanced wet flashover performance. The use of elastomeric materials permits the creation of the shed parts illustrated in all the figures with larger surface leakage distance to clearance ratios (International Electrotechnical Commission IEC Report— Publication 815 pg. 31, D3 and pg 37 FIG. 3a/b) than is possible with conventional ceramic designs which would either be too heavy or too brittle with such ratios. The shedded parts illustrated in FIGS. 1, 2, 3, 4, and 5 can be manufactured from any suitable material such as silicone rubber, ethylene propylene copolymer, ethylene propylene diene terpolymer, ethylene vinyl acetate copolymer, a blend of polyethylene copolymer and silicone elastomer, and the like. However, the particularly preferred molding composition and process recited herein are preferred. Optionally, the novel shed designs can be completely molded from a load bearing plastic such as FRP.

Figure 1:
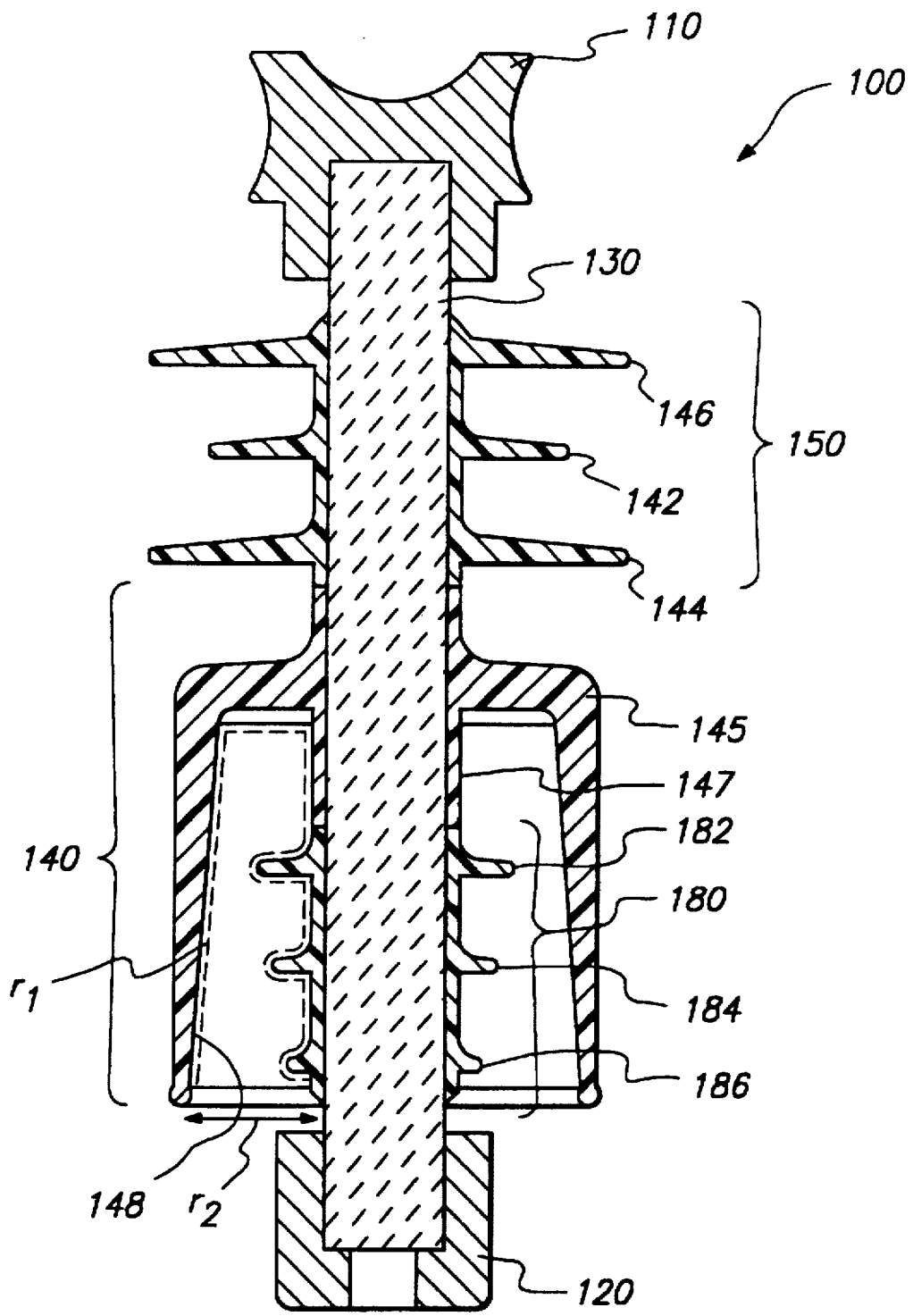
FIG. 1 is a cross-sectional view of an insulator including the improved shed designs of the present invention. The shed designs can be incorporated in or retrofitted on a polymeric or porcelain insulator to enhance flashover and arcing resistance in highly polluted environments.

FIG. 1 illustrates a hybrid insulator or shed 100 of this invention, having metallic end terminals 110 and 120 and an insulating core material 130 made from ceramic, FRP, composite, plastic, and the like, with polymeric shedded parts 140, 150 and 180 installed thereon. The polymeric shedded parts, preferably shedded parts 150 and 180, may have mold flash lines along the peripheral edge of the radial walled finned sections illustrated as 142, 144, 146, 182, 184 and 186, as opposed to along the longitudinal length of the part. This reduces contamination build-up and subsequent tracking and erosion damage. Additionally, shedded part 140 includes an overshed having a closed end, circumferential tubular, bell-shaped overshed 145 attached to one end of a tubular member 147. Overshed 145 has a leakage distance to clearance ratio of more than 5 to 1, preferably greater than 7.5 to 1, and most preferably greater than 10 to 1. This design permits particularly enhanced performance in highly polluted environments such as coastal or industrial areas, oil refineries, or soft coal burning regions. "Leakage distance to clearance ratio" means the ratio of the surface distance $r_1$ along the inner portion of the shed 148 to the distance $r_2$ between the edge of the outer shed 145 and the closer of the body of internal mini-shed 180 or core material 130. Generally, the greater the ratio, the greater the resistance to creepage and arcing. Internal mini-shed 180, which constitutes a third tubular shed portion of insulator 100, is located on the interior of shedded part 140, has two or more radial wall fin extension rings (shown here as rings 182, 184, and 186), thereby increasing the surface creepage length to reduce the effective electrical stress and the ingress of airborne contaminates. Insulating core material 130 preferably is a central internal porcelain or fiber glass reinforced rod having metal end fittings attached to the ends thereof.

Figure 6:
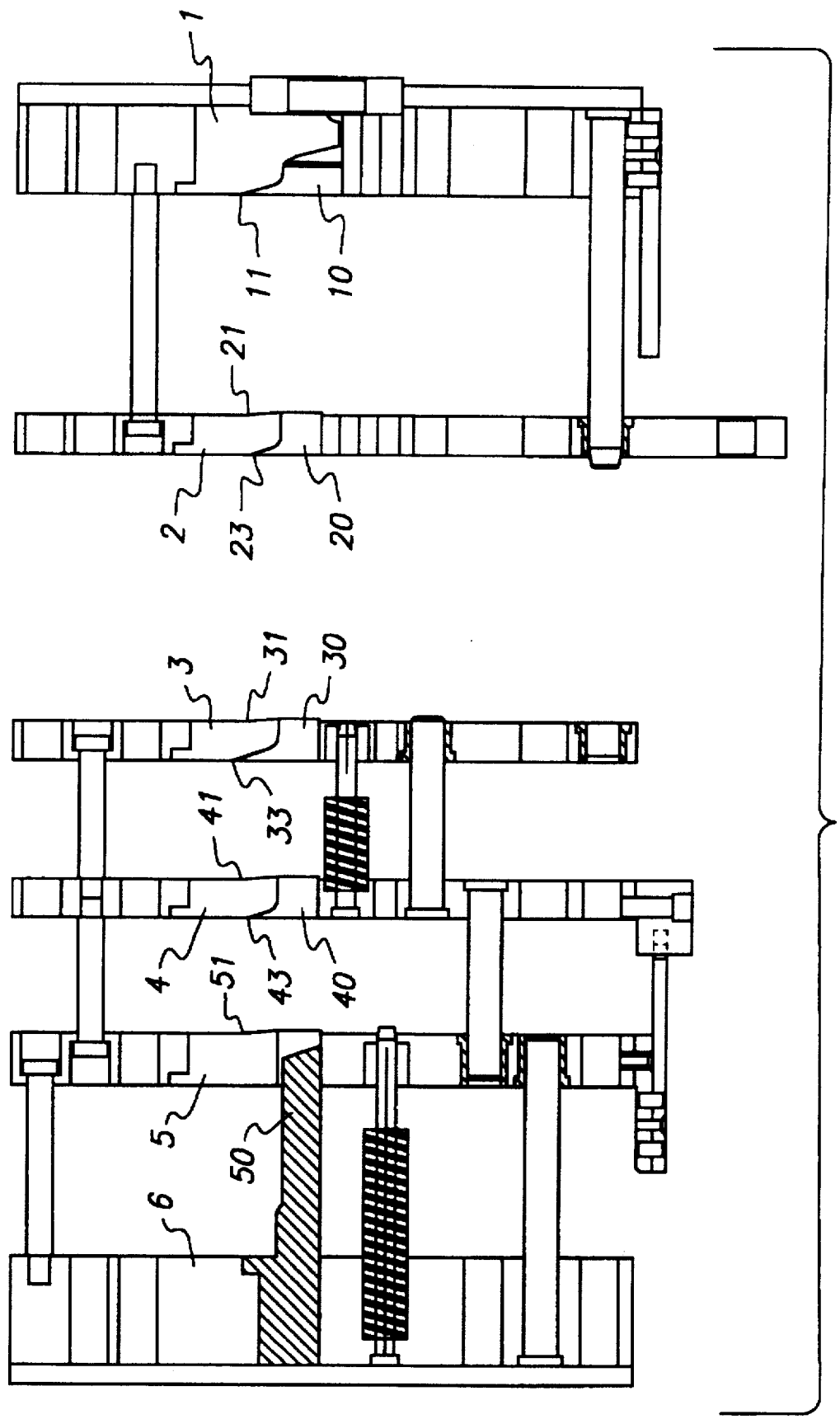
FIG. 6 illustrates a mold suitable for practicing the molding process of the present invention, with the mold in the open position.

FIG. 2 is an enlarged view of shedded part 150, highlighting its flashless molded multiple radial wall design. Part 150 has an internal diameter ID of the tubular portion which surrounds insulator 130, a length L, and a thickness t, as shown in the figure. Part 150 can be molded with any material such that the ratio ID/L is from about 0.25 to about 10, t is from about 0.254 mm (0.01 in) to about 12.7 mm (0.5 in), and the material has, at the molding temperature, a Shore A hardness of about 1 to about 80 and an elongation of about 50 to 1,200%. Preferably ratio ID/L is from about 0.75 to 2.5, thickness t is from about 0.762 mm (0.03 in) to about 5.08 mm (0.200 in), and the material has a hardness of about 10 to 60 shore A and an elongation of 300 to 900%. Most preferably ratio ID/L is from about 1.2 to about 1.8, thickness t is from about 1.91 mm (0.075 in) to about 2.54 mm (0.1 in), and the material has a hardness of about 30 to about 50 shore A and elongation of about 500 to about 800%. Softer materials and those with greater elongations can have thicker wall sections and lower ratios ID/L because the molded part can more easily collapse through the mold plates, as illustrated in FIG. 6 and discussed hereinbelow.

Optionally, because of the expandable nature of the elastomeric material, a bell-shaped overshed 200 is illustrated in FIG. 3. Overshed 200 has a closed end wall portion 210 and parallel longitudinal radial portions 220 and 230 with an interior longitudinal elastomeric tubular portion 240. The closed end tubular portions 220 and 230 can also be characterized as multiple longitudinal concentric bell-shaped members interior to the outer bell shape at the closed end or, alternatively, as closed ended nested tubular members. Overshed 200 may be used instead of shedded part 180 in FIG. 1. The elastomeric material permits fabrication of the sheds having leakage distance to clearance ratios for the most internal concentric or inner most nested closed end tubular member, e.g. element 230 in excess of 7 to 1 and preferably greater than 9 to 1 most preferably greater than 10 to 1 and particularly preferably all the way up to about 12 to 1 or higher. Preferably each of the interior bell-shaped members has a leakage distance to clearance ratio of greater than 5 to 1. Of course any surrounding concentric bells or outer closed end tubular members, e.g. 220, will be an approximate ratio. As before, larger ratios are preferred for the previously stated reasons.

FIG. 4 illustrates an optional shed design 300 of FIG. 1 further including a ring extension 360 to enhance flashover resistance. Ring extension 360 can be placed anywhere along the edge of the outer wall. Multiple ring extensions can be present but the illustrated design is preferred. Bell shaped overshed 300 is similar to shed 145 in FIG. 1 but includes the ring extension 360 at the shoulder of the bell shaped member 320. The ratio of the ring extension ($d_1$) to the distance of the shoulder from the longitudinal tube portion of the shed design ($d_2$) is preferably from about 0.1 to about 2.0, and more preferably 0.5 to 2.0 and most preferably 0.75 to 2.0. When the flashover ring had a ratio of 0.2, the wet flashover voltage increased by 25 to 35% when tested according to Section 4.3 of ANSI C29.1 (1988).

The design can additionally include an internal shedded part in environments where conductive dust tends to collect on the underside of the shed and cause flashover, such as those having in combination natural or manufacturing dust or having high salt content such as found in coastal environments.

FIG. 5 illustrates a design with an internal shedded part 500 having horizontal or radial ring members 540a through 540f, as an optional variant of shedded part 180 of FIG. 1. Members 540a through 540f can be of equal diameter as illustrated, or varied diameter, or increasing or decreasing diameter approaching shoulder 410. There is a synergistic effect between the outer bell member 400 (corresponding to shedded part 140 of FIG. 1), optionally having ring extension 460 on member 420 and member 500 which restrains and/or precludes airborne contaminants from entering and/or attaching to the interior of sheds 540a through 540f. Because airborne contaminants are prevented from reaching the interior of the sheds, they will have a higher flashover voltage.

The shed designs illustrated in FIGS. 1, 2, 3, 4, and 5 are preferably made with a silicone elastomer of this invention. However, any elastomer having high track resistance, arc resistance, flashover resistance, and flexibility coupled with sufficient structural rigidity to support shed designs having long vertical ribs with leakage distance to clearance ratios of greater than 5 and the ability to form ring extension ratios $d_1$ to $d_2$ greater than 0.1 is suitable. Exemplary suitable elastomers include ethylene propylene copolymer, ethylene propylene diene terpolymer, silicone elastomer rubber, ethylene vinyl acetate copolymer, a blend of polyethylene copolymer and silicone elastomer, and the like.

The preferred molding composition for a low modulus track resistance silicone comprises about 100 parts of polysiloxane containing about 0.15 to about 0.30 mole % vinyl groups and an equivalent amount (i.e., about 0.15 to about 0.30 mole %) of silicon hydride groups for crosslinking; about 2 to about 25 ppm and preferably about 5 to about 15 ppm platinum catalyst; about 0 to 20 parts per hundred rubber (phr), preferably 0 to 10 phr fumed titanium dioxide; about 2 to about 35 phr, preferably about 5 to about 20 phr of red iron oxide; and about 0 to about 50 phr but preferably about 0 to about 20 phr fumed silica; preferably without any or no more than a trace amount of aluminum trihydrate; and optionally about 0 to about 10 phr preferably about 0 to about 5 phr of silicone or fluorosilicone fluid with a viscosity of less than about 2,000 centistokes. The compound is typically crosslinked in a heated mold at about 150° C. or extruded and heated in a furnace at 350° C. The crosslinked compound has a Shore A hardness of about 30 to about 65, preferably between about 30 to about 50, measured according to ASTM D-2240. The compound also has an $M_{100}$ modulus of less than about 18 kg/cm² (260 psi), preferably between about 11 kg/cm² (150 psi) to about 7 kg/cm² (100 psi), measured according to ASTM D-412.

The particularly preferred composition is a silicone elastomer comprising about 100 parts polysiloxane, about 10 ppm platinum catalyst, about 10 phr fumed titanium dioxide, substantially no aluminum trihydrate or at least not in a level rising above a background impurity level, about 20 phr red iron oxide, and about 30 phr precipitated silica filler (Minusil®), most preferably in the absence of peroxide crosslinking agents. The composition showed high resistance to tracking.

The composition shows consistent tracking erosion time of greater than 240 minutes and the ability to withstand greater than 3.25 kV (tested according to ASTM-D2303, stepwise voltage procedure). The standard deviation of tracking and erosion time was reduced typically from ±115 to ±50 minutes. The failure mode was predominantly by erosion which is very desirable in sheds. This is in contrast to most other silicone compounds which fail by tracking. The low modulus of the compound facilitates the demolding of parts and permits their molding with circumferential flash line instead of longitudinal flash lines. The composition also reduces cost, since low levels of platinum and low fumed titanium dioxide (generally the most costly ingredients) are used. This composition substantially differs from prior art compositions such as Dow Corning Silastic® 29760-V gray materials which contain high concentrations of aluminum trihydrate or platinum and fumed titanium dioxide for flame resistance or platinum and titanium dioxide containing a peroxide catalyzed track resistant compound as previously taught in Penneck, U.S Pat. No. 4,521,549 (1985).

The composition is particularly useful as an insulating material for outdoor electrical distribution and transmission devices such as surge arresters, insulators, transformer bushings, cable terminations and cut out fuses assemblies. Surprisingly the composition has a low room temperature modulus (shore A between about 65 to about 30) which makes it easy to expand and easy to shrink during the manufacturing or application of the elastomer part. The prior art's utilization of very high levels of aluminum trihydrate increased tracking resistance but made the material very rigid. High levels of platinum or fumed titanium dioxide significantly increases the compound cost. Inclusion of high levels of aluminum trihydrate reduces the hydrophobicity of the material which increases water wetting of the outer shed when used on an insulators or a surge arrester. This increases the likelihood of arcing or tracking.

A particularly preferred use of the composition is in a molding process to make tubular molded parts with multiple radial wall extensions like element 150 in FIG. 1. The molding process uses the elastomeric properties of the material to permit the use mold plates which join substantially perpendicular to the longitudinal axis of the part. This molding process permits the creation of parts where the mold line flash material is along the periphery of the extremities of the sheds, reducing the need for buffing and cycle time while leading to increased tracking resistance. In addition, compositional variations of the composition at the mold line on the extremities have little or no effect on shed performance. The molding process is based on the highly unexpected discovery that the use of an elastomeric molding material permits the molded multiply radially walled part to pop through the molding plates especially upon the application of a vacuum to the internal structure of the tubular molded part during extraction from the mold.

In particular, the preferred embodiments are illustrated in FIG. 6 where the mold comprises plates 1, 2, 3, 4, 5, and 6 and a tubular forming insert 50 emanating from plate 6. The sheds or at least provisions for the sheds of the molded part are illustrated in elements 10, 20, 30 and 40 of FIG. 6 while the tubular nature is derived from the insert 50. The mold lines or flash points for the material instead of being along the longitudinal axis of the part occurs between 11 and 21, 23 and 31, 33 and 41, 43 and 51, respectively, upon the closing of the mold and injecting of the elastomeric composition. During the operation of the molding, plates 1, 2, 3, 4, 5, and 6 are brought together with sufficient pressure, heat, time, and temperature for the injection and curing of the elastomeric material.

The molding process illustrated in FIG. 6 may be carried out with an Engel 165 ton injection molding machine with vertical plattens or like machines. The Engel 165 machine was modified for the ejection of the part from a side of the mold as well as the need to move the plates. The reason for this modification is that the machine's opening stroke/ daylight between the plattens when completely open must provide space for the operator or robots between at least two plates such as plate 2 and plate 3 as well as plate 1 and plate 2 to be able to remove the part from plate 2. Other equipment like a shuttle press or a rotary press can be used and is preferred for manufacturing of higher volumes mainly due to the ease of adding more plates to the mold or more radial shed elements or other details and to reduce the ware on mold leader pins. The support for the mold would be very simple on a shuttle or rotary table while providing greater ability to open the plates and withdraw the part. The molding machine barrel is heated to approximately 49° C. and the barrel temperature can be adjusted up or down depending upon the mold temperature as well as the part size and the gating/venting of the mold from 15° C. A suitable molding time is a 2 minute cycle from clamping to unclamping to re-clamping that is from closing of the mold injecting the material molding the material and opening of the plate, removal of the finished part and re-closing to start a new cycle. The cycle time more specifically depends on the barrel temperature, the composition used in the mold, and the mold temperature.

During the actual molding operation a suitable molding temperature is about 149° C. to about 204° C., preferably 160° C. to 193° C., and most preferably about 182° C. Having described the overall sequence, the following description follows the cycle of the mold once the mold plates are closed and pressed together. With a closed mold, the preferred elastomeric material of the as invention is injected and has an average cure time of about 1 minute. Thereafter, the mold is opened between plates 5 and 6 and the core attached to plate 6 is pulled out of the part. The rest of the mold is held together using latchlocks and an injector system on a side of the press as well as springs. Subsequently, mold plates 4 and 5 open via a stripper bolt to free these sections. Subsequent to this operation, molding plates 3 and 4 open which free the section of the part collapse in a space where the core is removed and pulled through plate 4. After the part is pulled through plate 4, the mold is further opens between plates 3 and 2 and the part is pulled through plate 3 as in the prior step. The mold opening plates continues for plates 1 and 2 with the mold in a completely open position, the part is on the side of the plate facing plate 3 at which point the mold operator or robot is capable of removing the part from between open plates 2 and 3.

This molding technique would not be possible with a rigid material but through the unexpected realization that the compliant nature of an elastomer, such as the preferred silicone elastomer, and the parts tubular nature permitted the molding of a part where the line separation or flash point is not along the longitudinal axis where the mold parts generally would come together along the longitudinal axis but on the edges of the rings of the molded part. Although the particular structure has been described which would have alternating large and small radial wall ring extensions, any number of ring extensions or configurations can be achieved according to the process of the invention. The present molding process permits the manufacture of a molded part with a cycle time on the order of about a minute as opposed to the cycle time with buffing of the mold line in excess of seven minutes to create a comparable part.

The invention has been described with respect to particularly preferred embodiments but modifications which would be obvious to the ordinary skilled artisan are contemplated to be within the scope of the invention, for example, the molding machine can use greater or fewer plates, the flashing point can be removed to the edge of the bell to provide a drip line to further enhance performance, the novel shed designs could be cast or machined in structural plastic such as FRP, and the like.

What is claimed is:

1. A tubular polymeric shed comprising a central tubular portion and at least two radial wall fin extensions extending therefrom, the shed being made of a molded polymeric composition which has at its molding temperature a Shore A hardness of about 1 to about 80 and has an elongation of about 50 to 1,200% and having mold flash lines located peripherally on the edges of the radial wall fin extensions, wherein the ratio ID/L of the internal diameter ID to the length L of the fin extensions is from about 0.250 to about 10 and the wall thickness t of the central tubular portion is from about 0.254 to about 12.7 mm.

2. A shed according to claim 1, further having a closed end circumferential outer tubular member joined to the central tubular portion of the shed at the closed end, such that the shed has a leakage distance to clearance ratio of greater than 5 to 1.

3. A shed according to claim 2, wherein the closed end circumferential outer tubular member is bell-shaped and has sufficient diameter such that the shed design further includes at least multiple concentric tubular bell shaped members interior to the outer bell shape joined at the closed end and wherein the surface leakage to clearance ratio is greater than 5 to 1 for each of the tubular concentric bell shaped members.

4. A shed according to claim 2, outer tubular member has a third tubular shed portion located on the interior thereof, the third tubular shed portion having two or more radial wall fin extension rings, thereby increasing the surface creepage length to reduce the effective electrical stress and the ingress of airborne contaminates.

5. A shed according to any of claims 3 through 5, further including at least one wet flashover ring extension having an extension ratio between about 0.1 and about 2.0, located on the outer edge of the bell shape.

* * * * *